United States Patent
Fine et al.

(10) Patent No.: US 10,831,710 B2
(45) Date of Patent: Nov. 10, 2020

(54) METHOD AND SYSTEM FOR IMPLEMENTING NAMESPACE AGGREGATION BY SINGLE REDIRECTION OF FOLDERS FOR NFS AND SMB PROTOCOLS

(71) Applicant: Dell Products L.P., Round Rock, TX (US)

(72) Inventors: Dina Fine, Herzlia (IL); Volodymyr Khomenko, Smila (UA)

(73) Assignee: Dell Products L.P., Round Rock, TX (US)

( * ) Notice: Subject to any disclaimer, the term of this patent is extended or adjusted under 35 U.S.C. 154(b) by 606 days.

(21) Appl. No.: 15/227,242

(22) Filed: Aug. 3, 2016

(65) Prior Publication Data

US 2018/0039649 A1 Feb. 8, 2018

(51) Int. Cl.
G06F 16/16 (2019.01)
H04L 29/08 (2006.01)

(52) U.S. Cl.
CPC .......... *G06F 16/16* (2019.01); *G06F 16/164* (2019.01); *H04L 67/1097* (2013.01)

(58) Field of Classification Search
CPC .................................. G06F 17/30115
USPC ........................................ 707/827
See application file for complete search history.

(56) References Cited

U.S. PATENT DOCUMENTS

| | | | |
|---|---|---|---|
| 2004/0233910 A1* | 11/2004 | Chen .................. | H04L 67/1097 370/395.5 |
| 2007/0088702 A1* | 4/2007 | Fridella et al. ........ | G06F 17/30 707/999.01 |
| 2009/0177720 A1* | 1/2009 | Shitomi et al. ........ | G06F 12/16 707/999.204 |
| 2011/0251992 A1* | 10/2011 | Bethlehem et al. .... | G06F 17/30 707/610 |
| 2014/0082508 A1* | 3/2014 | Rajashekar ............ | H04L 69/18 715/739 |

* cited by examiner

*Primary Examiner* — Muluemebet Gurmu
(74) *Attorney, Agent, or Firm* — Pearl Cohen Zedek Latzer Baratz LLP

(57) ABSTRACT

A system and a method of enabling a single redirection of folders for Network File System (NFS) and Server Message Block (SMB) protocols in a Network Attached Storage (NAS) device, are provided herein. The method may include: maintaining a NAS device comprising local folders which point to a volume of the NAS and redirection folders pointing to targets external to the NAS device; generating, using a NAS administrator, a configuration namespace from the redirection folders and a user interface (UI) configured to manage the redirection folders; configuring the NAS administrator to define names of the redirection folders as seen by end users and respective location of the redirection folder inside the NAS volume data path, and pointing, via each redirection folder, to at least one of: SMB, and NFS remote target points, responsive to an end user request via redirection data provided thereto.

10 Claims, 2 Drawing Sheets

METHOD AND SYSTEM FOR IMPLEMENTING NAMESPACE AGGREGATION BY SINGLE REDIRECTION OF FOLDERS FOR NFS AND SMB PROTOCOLS

FIELD OF THE INVENTION

The present invention relates generally to the field of managing a file system, and more particularly to implementing a reverse directory lookup in file systems.

BACKGROUND OF THE INVENTION

Prior to the background of the invention being set forth, it may be helpful to provide definitions of certain terms that will be used hereinafter.

The term "file" as used herein is defined as a container for storing data.

The term "directory" or "standard folder" as used herein is defined as a cataloging structure of a file system which contains references (known as "filenames") to other files, and other directories.

The term "folder redirection" as used herein is defined as automatically re-routing input/output (I/O) to and/or from standard folders (directories) to use storage elsewhere on a network. Folder redirection is often used in an organization network environment, to ensure that users do not store data locally, when a network device is the preferred storage location.

The term "Server Message Block" (SMB) as used herein is an application-layer network protocol mainly used for providing shared access to files, and miscellaneous communications between nodes on a network.

The term "Network File System" (NFS) as used herein is a distributed file system protocol allowing a user on a client computer to access files over a computer network much like local storage is accessed.

Namespace Aggregation is a virtual view of shared folders in an organization. The feature is required when the Administrator wants to give users a single place to locate data, but to host the data on different servers.

Different network attached storage (NAS) vendors suggest different methods for folders redirections but these are methods are all limited to be protocol dependent. For SMB clients the redirection is based either on DFS implementation, or SMB2 widelinks. For NFSv4 clients, NFS referrals is used; however, a different folder (link) should be created per protocol.

SUMMARY OF THE INVENTION

Some embodiments of the present invention implement a single folder structure that redirects SMB client to remote SMB shares, while redirecting NFSv4 clients to remote NFS exports at the same time. Advantageously, some embodiments of the present invention allow ease of use to define single namespace for multi-protocol access.

Some embodiments of the present invention allow a single folder to redirect both NFS and SMB client to a remote destination.

Some embodiments of the present invention suggest an implementation method to support multi-protocol single namespace folder redirections based on NFSv4 referrals and SMB2 widelinks client abilities.

BRIEF DESCRIPTION OF THE DRAWINGS

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings in which:

Figure 1:
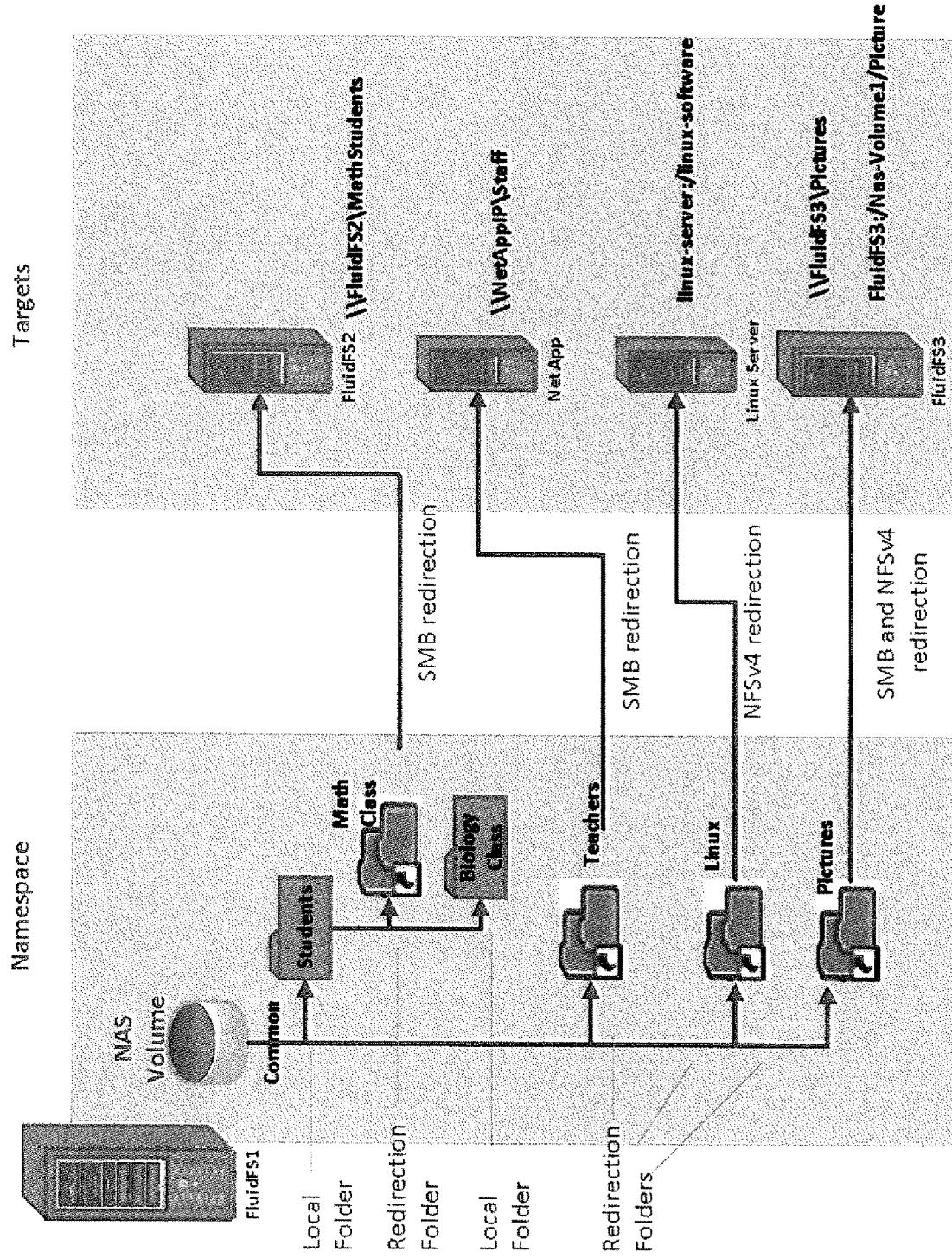
FIG. 1 is a block diagram illustrating a block diagram of a system in accordance with some embodiments of the present invention.

It may be appreciated that, for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

DETAILED DESCRIPTION OF THE INVENTION

In the following description, various aspects of the present invention may be described. For purposes of explanation, specific configurations and details are set forth in order to provide a thorough understanding of the present invention. However, it may also be apparent to one skilled in the art that the present invention may be practiced without the specific details presented herein. Furthermore, well known features may be omitted or simplified in order not to obscure the present invention.

Unless specifically stated otherwise, as apparent from the following discussions, it is appreciated that throughout the specification discussions utilizing terms such as "processing," "computing," "calculating," "determining," or the like, refer to the action and/or processes of a computer or computing system, or similar electronic computing device, that manipulates and/or transforms data represented as physical, such as electronic, quantities within the computing system's registers and/or memories into other data similarly represented as physical quantities within the computing system's memories, registers or other such information storage, transmission or display devices.

FIG. 1 is a diagram illustrating the architecture of a system in accordance with embodiments of the present invention. In FIG. 1, FluidFS1 denotes an exemplary non-limiting NAS system such as a distributed shared file system cluster which hosts the namespace configuration and redirection folders; Local folder denotes a regular folder or a directory.

A redirection folder as explained above looks like a regular folder to the end user, but redirects the end-client to a remote SMB share (for SMB users only), or remote NFSv4 export (for NFS users only) or both (SMB users will be redirected to shares, and NFS users to exports).

In accordance with some embodiments of the present invention, the NAS Administrator defines the aggregation by providing a set of remote SMB shares and remote NFS exports via user interface (UI). The namespace is built from individual redirection folders.

In accordance with some embodiments of the present invention, each redirection folder points to a remote share or export or both. The redirection folder name (seen by end users) is defined by the administrator as well as the location of the redirection folder inside the NAS volume data path. The redirection folder can be set up on already existing directory, but the directory should be empty.

In accordance with some embodiments of the present invention, enabling a single redirection folder to serve both NFS export and SMB share redirection is made possible.

In accordance with some embodiments of the present invention, the permissions to access the redirected data are defined by the destination share, export, destination volume subnets limitations, access based enumeration, and remote system security in general. Changes in redirection folder parents' names are propagated to the configuration view in the UI.

In accordance with some embodiments of the present invention, and as mentioned above, namespace aggregation is defined in NAS Volume scope. The administrator is configured to define a set of redirection folders.

In accordance with some embodiments of the present invention, and for each redirection folder the following data is required from the administrator
  Remote server
  Remote SMB share and/or NFS export
  Redirection folder location inside local NAS volume path
  Redirection folder name In accordance with some embodiments of the present invention, the administrator is configured to add an additional redirection folder, to view, delete and modify an existing one.

In accordance with some embodiments of the present invention, the single SMB/NFS redirection folder implementation is detailed hereinafter.

In accordance with some embodiments of the present invention, redirection folder data may include the following components:
  1. Redirection folder indicator special mark in the folder to recognize redirection folder vs regular directory. Redirection folder indicator will be stored inside the Mode of each directory. In this way by examining the metadata of the directory it can be easily recognized whether this is a regular directory or redirection folder and skip the logic of full processing of redirection folders for regular directories (performance-critical flow).
  2. Per-folder information—details about target location referred by each redirection folder, i.e. remote hostname, export name for NFS redirection folder and share name for SMB redirection folder. This information is independent for each redirection folder and is needed for SMB/NFS flows to process the actual redirection logic.

In accordance with some embodiments of the present invention, the remote targets (NFS and SMB) information is stored on the internal attached file. The attached file is not seen to the end user. The file encodes SMB and NFS remote targets information.

In accordance with some embodiments of the present invention, following is an exemplary non-limiting implementation referring the SMB2 protocol:

In accordance with some embodiments of the present invention, redirection folder feature is integrated with SMB protocol in the following way:
  Redirection folder is seen by SMB2 client as SMB directory absolute widelink (reparse point of SYMLINK type). Client is then referred to the target location (specified by hostname/share name parameters of redirection folder) if the client tries to follow this widelink.
  Modification operations for SMB widelink corresponding to redirection folder (move, rename, delete, fs_control to modify the target and to reset widelink content) must be blocked.

In accordance with some embodiments of the present invention, all modifications of redirection folder should be carried out only via the UI (rather than by the protocols).

In accordance with some embodiments of the present invention, redirection folder feature is integrated with NFS4 protocol in the following way:
  Supposing the end user is trying to access /vol0/Applications/LinuxApplications. The following NFSv4 compound command is send to file system server.
  Compound Verb:
  a) PUTROOTFH
  b) LOOKUP "vol0"
  c) LOOKUP "Applications"
  d) LOOKUP "LinuxApplications"
  e) GETFH
  GETATTR (fsid, fileid, size, time_modify)

In accordance with some embodiments of the present invention, the NFSv4 server is configured to process requests one by one. For each component (vol0, Applications and Linux Applications), the server is configured to query the FSAPI for the directories DSID (lookup). Then on getFH processing, the server is configured to query the folder metadata. Then it is checked whether the directory is a redirection folder.

In accordance with some embodiments of the present invention, in a case that the folder is not a redirection folder, the flow proceeds as usual and returns to the end user the information requested (DSIDs of all directories, and attributes of Linux Applications).

In a case that the folder is a NFSv4 redirection folder, the following actions are taken:
  a) Reply on lookup request, deny GETFH with NFS4ERR_MOVED.
  b) Client sends a new GETATTR, this time with fs_locations flag.
  c) The server queries the folder redirection data, replies to the client with the remote server information.
  d) Client internally establishes new TCP connection to the remote server host and remote server path.

In accordance with some embodiments of the present invention, in a case that the client has the file handle of the directory and later referral is set on the directory, any creation of files/directory inside this referral directory will be denied.

Figure 2:
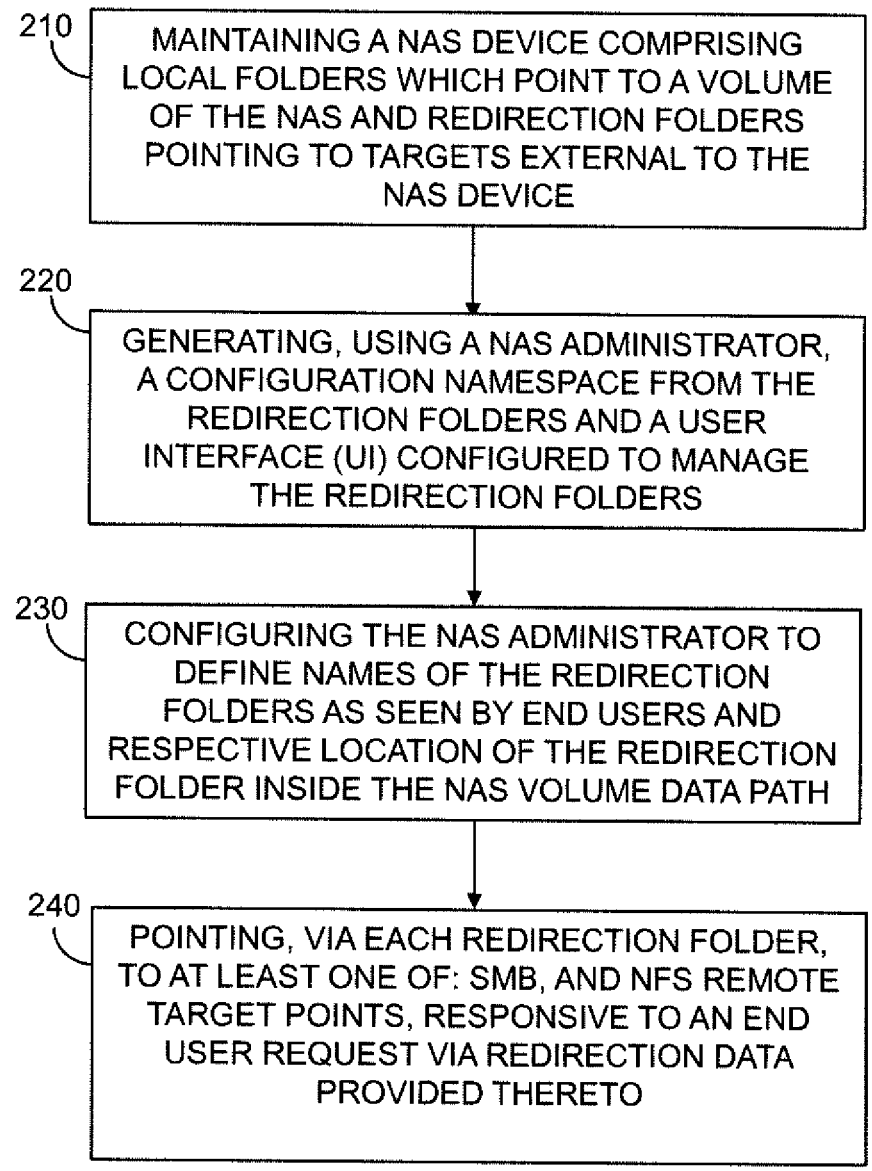
FIG. 2 is a flow chart diagram illustrating a method in accordance with some embodiments of the present invention.

FIG. 2 is a flow chart diagram illustrating a method of enabling a single redirection of folders for Network File System (NFS) and Server Message Block (SMB) protocols in a Network Attached Storage (NAS) device, in accordance with some embodiments of the present invention. Method 200 may include: maintaining a NAS device comprising local folders which point to a volume of the NAS and redirection folders pointing to targets external to the NAS device 210; generating, using a NAS administrator, a configuration namespace from the redirection folders and a user interface (UI) configured to manage the redirection folders 220; configuring the NAS administrator to define names of the redirection folders as seen by end users and respective location of the redirection folder inside the NAS volume data path 230; and pointing, via each redirection folder, to at least one of: SMB, and NFS remote target points, responsive to an end user request via redirection data provided thereto 240.

In accordance with some embodiments of the present invention, the aforementioned flow may be implemented as a non-transitory computer readable medium.

In order to implement the method according to some embodiments of the present invention, a computer processor may receive instructions and data from a read-only memory or a random access memory or both. At least one of aforementioned steps is performed by at least one processor associated with a computer. The essential elements of a computer are a processor for executing instructions and one or more memories for storing instructions and data. Generally, a computer may also include, or be operatively coupled to communicate with, one or more mass storage devices for storing data files. Storage modules suitable for tangibly embodying computer program instructions and data include all forms of non-volatile memory, including by way of example semiconductor memory devices, such as EPROM, EEPROM, and flash memory devices and also magneto-optic storage devices.

As may be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in base band or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wire-line, optical fiber cable, RF, and the like or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described above with reference to flowchart illustrations and/or portion diagrams of methods, apparatus (systems) and computer program products according to some embodiments of the invention. It may be understood that each portion of the flowchart illustrations and/or portion diagrams, and combinations of portions in the flowchart illustrations and/or portion diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or portion diagram portion or portions.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or portion diagram portion or portions.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or portion diagram portion or portions.

The aforementioned flowchart and diagrams illustrate the architecture, functionality, and operation of possible implementations of systems, methods and computer program products according to various embodiments of the present invention. In this regard, each portion in the flowchart or portion diagrams may represent a module, segment, or portion of code, which includes one or more executable instructions for implementing the specified logical function(s). It should also be noted that, in some alternative implementations, the functions noted in the portion may occur out of the order noted in the figures. For example, two portions shown in succession may, in fact, be executed substantially concurrently, or the portions may sometimes be executed in the reverse order, depending upon the functionality involved. It may also be noted that each portion of the portion diagrams and/or flowchart illustration, and combinations of portions in the portion diagrams and/or flowchart illustration, can be implemented by special purpose hardware-based systems that perform the specified functions or acts, or combinations of special purpose hardware and computer instructions.

In the above description, an embodiment is an example or implementation of the inventions. The various appearances of "one embodiment," "an embodiment" or "some embodiments" do not necessarily all refer to the same embodiments.

Although various features of the invention may be described in the context of a single embodiment, the features may also be provided separately or in any suitable combination. Conversely, although the invention may be described herein in the context of separate embodiments for clarity, the invention may also be implemented in a single embodiment.

Reference in the specification to "some embodiments", "an embodiment", "one embodiment" or "other embodiments" means that a particular feature, structure, or characteristic described in connection with the embodiments is included in at least some embodiments, but not necessarily all embodiments, of the inventions.

It is to be understood that the phraseology and terminology employed herein is not to be construed as limiting and are for descriptive purpose only.

The principles and uses of the teachings of the present invention may be better understood with reference to the accompanying description, figures and examples.

It is to be understood that the details set forth herein do not construe a limitation to an application of the invention.

Furthermore, it is to be understood that the invention can be carried out or practiced in various ways and that the invention can be implemented in embodiments other than the ones outlined in the description above.

It is to be understood that the terms "including", "comprising", "consisting" and grammatical variants thereof do not preclude the addition of one or more components, features, steps, or integers or groups thereof and that the terms are to be construed as specifying components, features, steps or integers.

If the specification or claims refer to "an additional" element, that does not preclude there being more than one of the additional element.

It is to be understood that where the claims or specification refer to "a" or "an" element, such reference is not be construed that there is only one of that element.

It is to be understood that where the specification states that a component, feature, structure, or characteristic "may", "might", "can" or "could" be included, that particular component, feature, structure, or characteristic is not required to be included.

Where applicable, although state diagrams, flow diagrams or both may be used to describe embodiments, the invention is not limited to those diagrams or to the corresponding descriptions. For example, flow need not move through each illustrated box or state, or in exactly the same order as illustrated and described.

Methods of the present invention may be implemented by performing or completing manually, automatically, or a combination thereof, selected steps or tasks.

The term "method" may refer to manners, means, techniques and procedures for accomplishing a given task including, but not limited to, those manners, means, techniques and procedures either known to, or readily developed from known manners, means, techniques and procedures by practitioners of the art to which the invention belongs.

The descriptions, examples, methods and materials presented in the claims and the specification are not to be construed as limiting but rather as illustrative only.

Meanings of technical and scientific terms used herein are to be commonly understood as by one of ordinary skill in the art to which the invention belongs, unless otherwise defined.

The present invention may be implemented in the testing or practice with methods and materials equivalent or similar to those described herein.

Any publications, including patents, patent applications and articles, referenced or mentioned in this specification are herein incorporated in their entirety into the specification, to the same extent as if each individual publication was specifically and individually indicated to be incorporated herein. In addition, citation or identification of any reference in the description of some embodiments of the invention shall not be construed as an admission that such reference is available as prior art to the present invention.

While the invention has been described with respect to a limited number of embodiments, these should not be construed as limitations on the scope of the invention, but rather as exemplifications of some of the preferred embodiments. Other possible variations, modifications, and applications are also within the scope of the invention. Accordingly, the scope of the invention should not be limited by what has thus far been described, but by the appended claims and their legal equivalents.

The invention claimed is:

1. A system for enabling a single redirection of folders for Network File System (NFS) and Server Message Block (SMB) protocols in a Network Attached Storage (NAS) device, the system comprising:
    a NAS device comprising local folders which point to a volume of the NAS and redirection folders pointing to targets external to the NAS device; and
    a user interface (UI) configured to manage the redirection folders,
    wherein each said redirection folder is built through a configuration using the UI,
    wherein said configuration includes defining redirection data to each said redirection folders,
    wherein each said redirection folder is capable of pointing to at least one of:
    SMB, and NFS remote target points, responsive to an end user request via redirection data provided thereto,
    wherein each said redirection folder is implemented as a single folder structure that redirects SMB clients to remote SMB shares, while redirecting NFSv4 clients to remote NFS exports at the same time, and
    wherein a modification to each said redirection folder via the SMB and the NFS protocols is blocked and is carried out only via said UI,
    wherein in a case of an NFSv4 redirection folder, the following actions are taken:
    replying on lookup request, denying Get Current File Handle operation (GETFH) with an NFS4ERR_MOVED error; sending by the end client a new Get Attribute (GETATTR) request operation, including flag locations where the filesystem may be found (fs_locations flag); querying by the server the folder redirection data, replying to the client with the remote server information; and establishing by the end client internally new TCP connection to the remote server host and remote server path.

2. The system according to claim 1, wherein said redirection data to the redirection folder comprise: Remote server, Remote SMB share and/or NFS export, Redirection folder location inside local NAS volume path and Redirection folder name.

3. The system according to claim 1, wherein each redirection folder comprises a redirection folder indicator differentiating the folder from a local folder and stored inside the Mode of each directory; and per-folder information comprising details about target location referred by each redirection folder, the per-folder information being independent for each redirection folder and is needed for SMB/NFS flows to process the actual redirection logic.

4. The system according to claim 3, wherein the per-folder information comprises remote hostname, export name for NFS redirection folder and share name for SMB redirection folder.

5. The system according to claim 1, wherein in a case of an SMB redirection folder, the redirection folder is seen by the end client as SMB directory absolute widelink, wherein the end client is then referred to the target location in a case the client tries to follow this widelink, and wherein modification operations for SMB widelink corresponding to redirection folder are blocked.

6. A method of enabling a single redirection of folders for Network File System (NFS) and Server Message Block (SMB) protocols in a Network Attached Storage (NAS) device, the method comprising:
maintaining a NAS device comprising local folders which point to a volume of the NAS and redirection folders pointing to targets external to the NAS device;
configuring redirection data to each said redirection folders using a user interface (UI); and
pointing, via each redirection folder, to at least one of: SMB, and NFS remote target points, responsive to an end user request via redirection data provided thereto,
wherein each said redirection folder is implemented as a single folder structure that redirects SMB clients to remote SMB shares, while redirecting NFSv4 clients to remote NFS exports at the same time, and
wherein a modification to each said redirection folder via the SMB and the NFS protocols is blocked and is carried out only via said UI,
wherein in a case of an NFSv4 redirection folder, the following actions are taken: replying on lookup request, denying Get Current File Handle operation (GETFH) with an NFS4ERR_MOVED error; sending by the end client a new Get Attribute (GETATTR) request operation, including flag locations where the filesystem may be found (fs_locations flag); querying by the server the folder redirection data, replying to the client with the remote server information; and establishing by the end client internally new TCP connection to the remote server host and remote server path.

7. The method according to claim 6, wherein said redirection data to the redirection folder comprise: Remote server, Remote SMB share and/or NFS export, Redirection folder location inside local NAS volume path and Redirection folder name.

8. The method according to claim 6, wherein each redirection folder comprises a redirection folder indicator differentiating the folder from a local folder and stored inside the inode of each directory; and per-folder information comprising details about target location referred by each redirection folder, the per-folder information being independent for each redirection folder and is needed for SMB/NFS flows to process the actual redirection logic.

9. The method according to claim 8, wherein the per-folder information comprises remote hostname, export name for NFS redirection folder and share name for SMB redirection folder.

10. The method according to claim 6, wherein in a case of an SMB redirection folder, the redirection folder is seen by the end client as SMB directory absolute widelink, wherein the end client is then referred to the target location in a case the client tries to follow this widelink, and wherein modification operations for SMB widelink corresponding to redirection folder are blocked.

* * * * *